United States Patent [19]
Akada et al.

[11] Patent Number: 5,726,762
[45] Date of Patent: Mar. 10, 1998

[54] COPYING MACHINE WITH MEMORY OUTPUT START TIME CONTROL

[75] Inventors: Yukihisa Akada; Hitoshi Ejima, both of Saitama, Japan

[73] Assignee: Fuji Xerox Co., Ltd., Tokyo, Japan

[21] Appl. No.: 417,215

[22] Filed: Apr. 5, 1995

[30] Foreign Application Priority Data

Sep. 28, 1994 [JP] Japan .................. 6-233621

[51] Int. Cl.$^6$ .................. H04N 1/36
[52] U.S. Cl. .................. 358/401; 404/413; 404/468
[58] Field of Search .................. 358/468, 404, 358/444, 401, 449, 412, 413, 409

[56] References Cited

U.S. PATENT DOCUMENTS

| | | | |
|---|---|---|---|
| 5,055,935 | 10/1991 | Ohno | 358/468 |
| 5,119,210 | 6/1992 | Baba | 358/444 |
| 5,177,620 | 1/1993 | Fukushima | 358/468 |
| 5,212,566 | 5/1993 | U et al. | 358/444 |
| 5,239,387 | 8/1993 | Stein et al. | 358/444 |
| 5,253,077 | 10/1993 | Hasegawa et al. | 358/401 |
| 5,280,348 | 1/1994 | Honma et al. | 358/401 |
| 5,343,225 | 8/1994 | Yamaguchi | 358/296 |

FOREIGN PATENT DOCUMENTS 0 465 093 A2  1/1992  European Pat. Off. .
0 526 341 A2  3/1993  European Pat. Off. .

*Primary Examiner*—Edward L. Coles, Sr.
*Assistant Examiner*—Fan Lee
*Attorney, Agent, or Firm*—Finnegan, Henderson, Farabow, Garrett & Dunner, L.L.P.

[57] ABSTRACT

An original reading device reads an image on an original in response to a read command, to produce image data, which is stored into an image memory. An output device performs an output process in which copying onto a sheet is effected based on the image data stored in the image memory and the copied sheet is discharged. A control device supplies the read command to the original reading device, and outputs an output command to the output device at such a timing that the output process of the output device is completed at a time point when the reading of the original by the original reading device is also completed.

3 Claims, 10 Drawing Sheets

Ls: NUMBER OF LINES OF IMAGE DATA THAT SHOULD BE STORED AT THE START OF READING
L : MEMORY LENGTH (LINES)
W : MEMORY WIDTH (WORD = 16 DOTS)

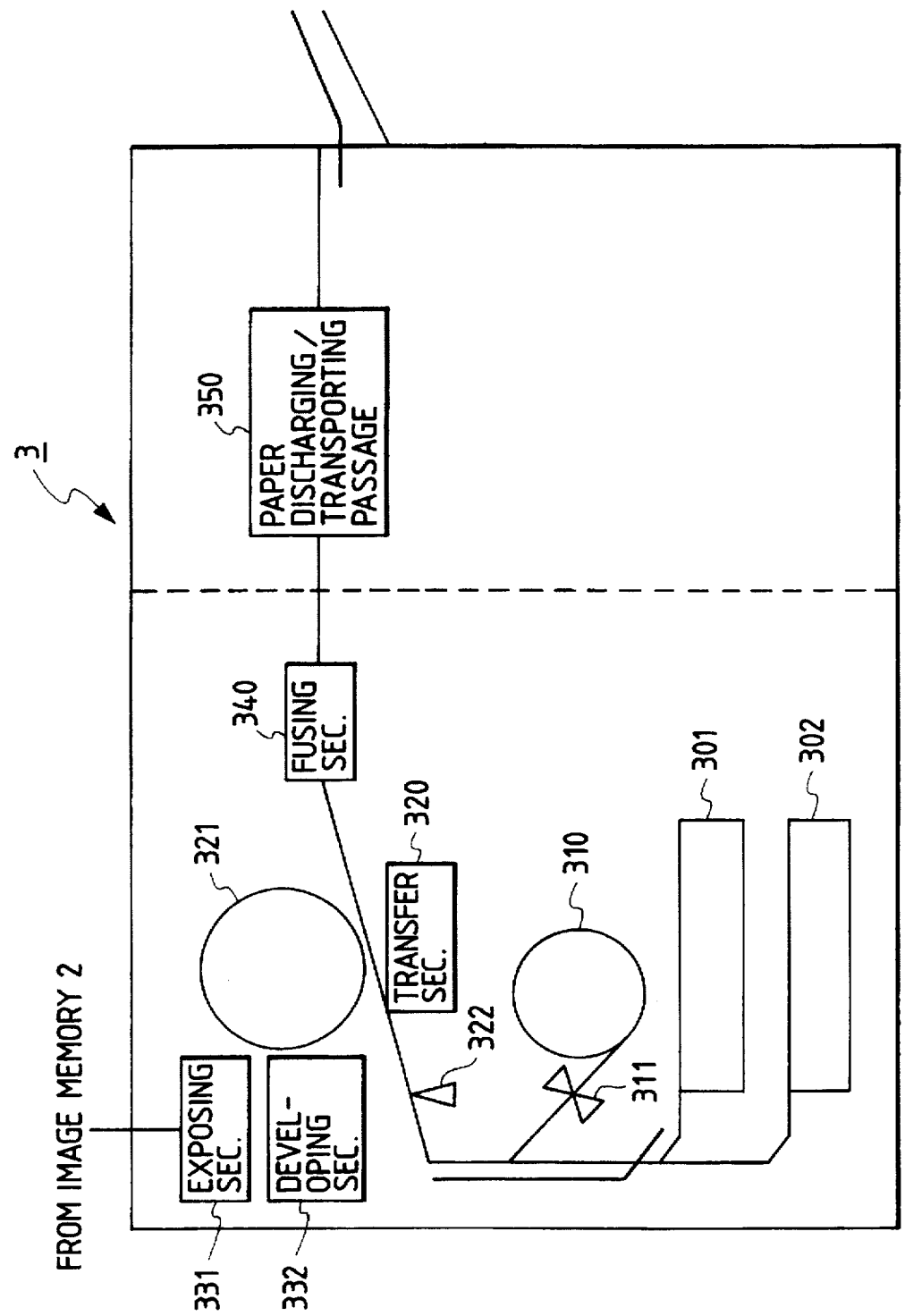

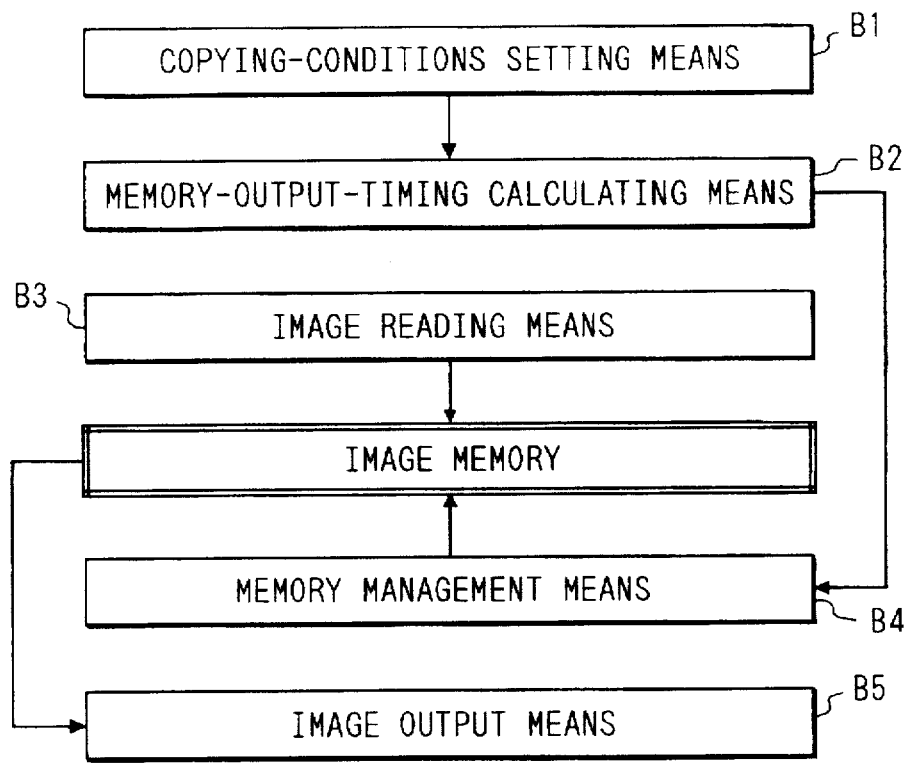
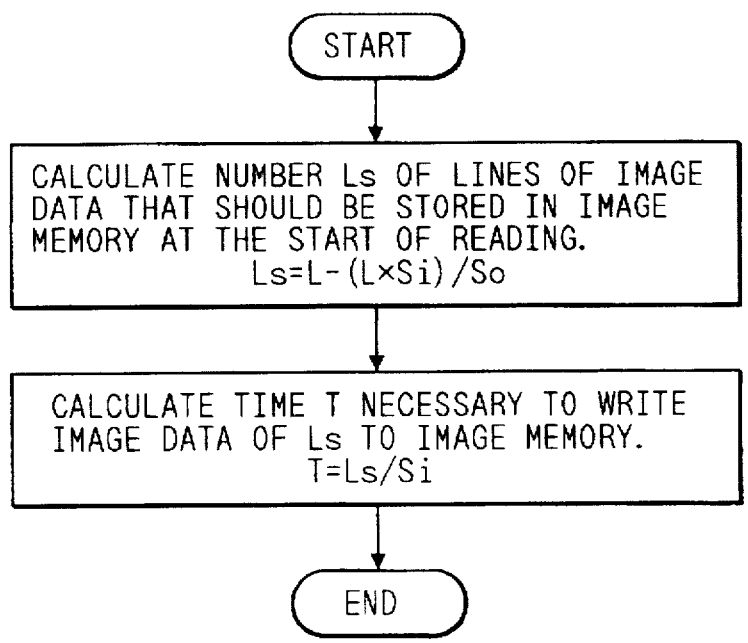

Ls: NUMBER OF LINES OF IMAGE DATA THAT SHOULD BE STORED AT THE START OF READING
L: MEMORY LENGTH (LINES)
W: MEMORY WIDTH (WORD = 16 DOTS)

ACTUAL MEMORY AREA C

VIRTUAL MEMORY AREA
$C' = C/\{1-(Si/So)\}$

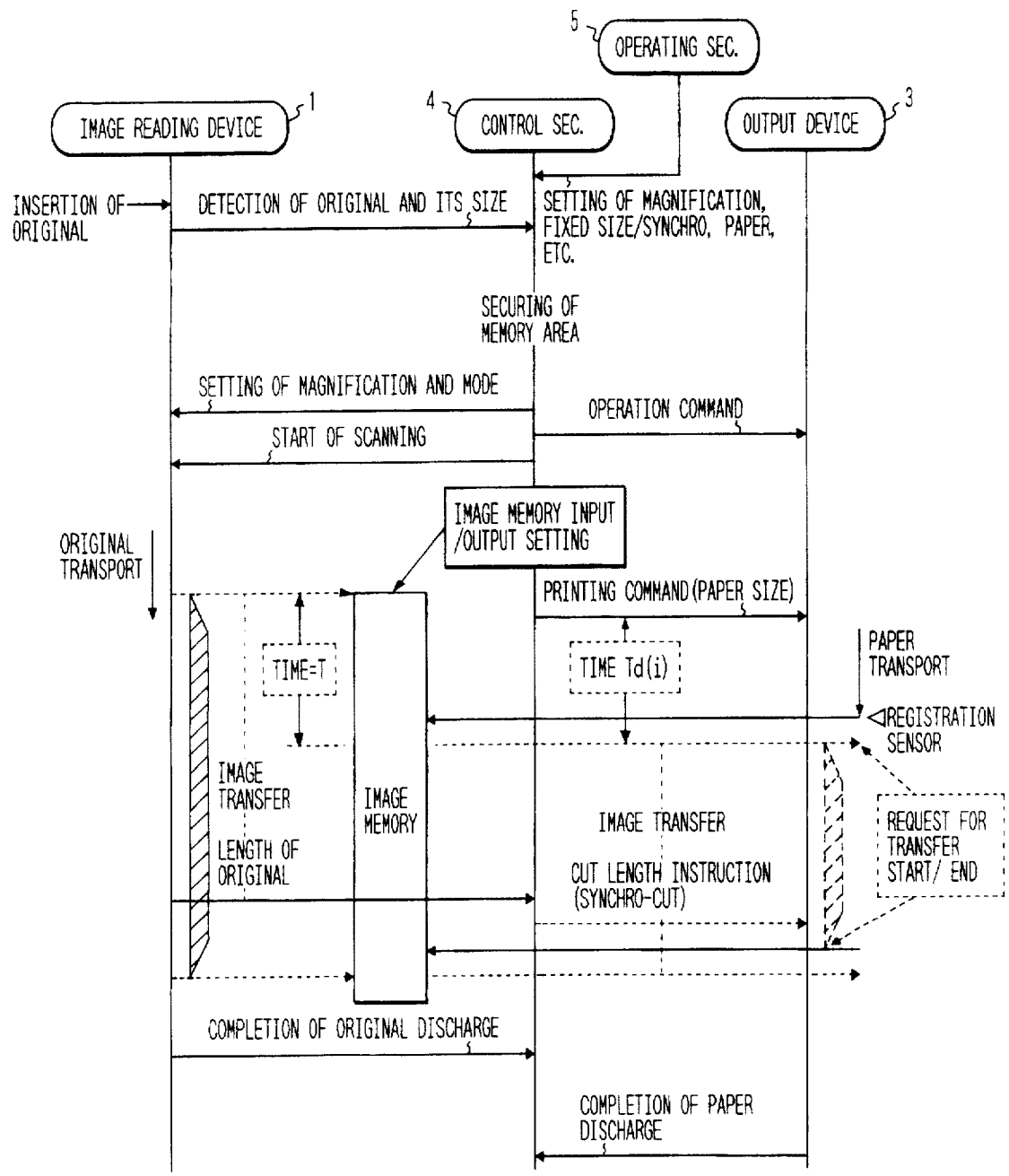

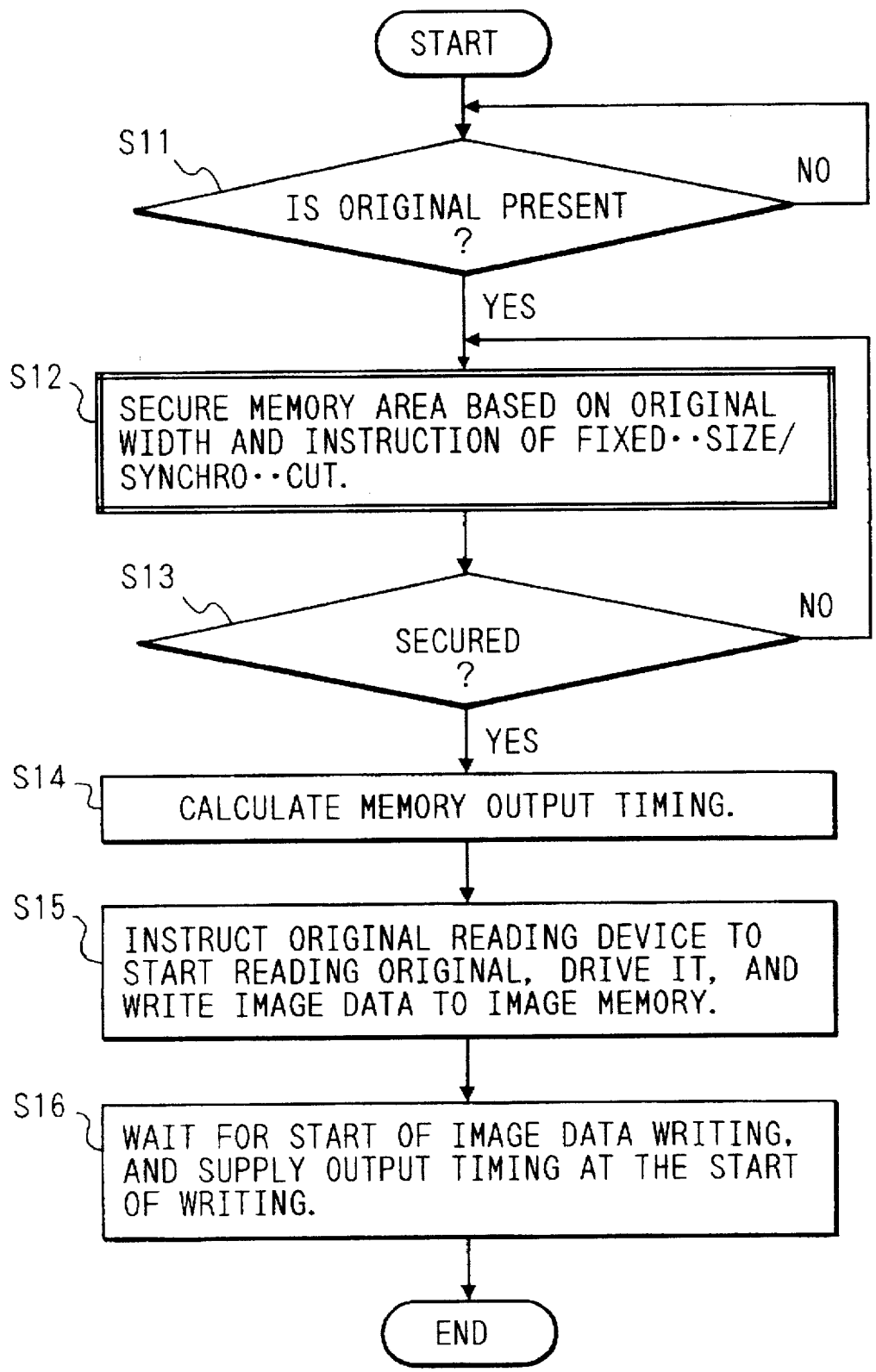

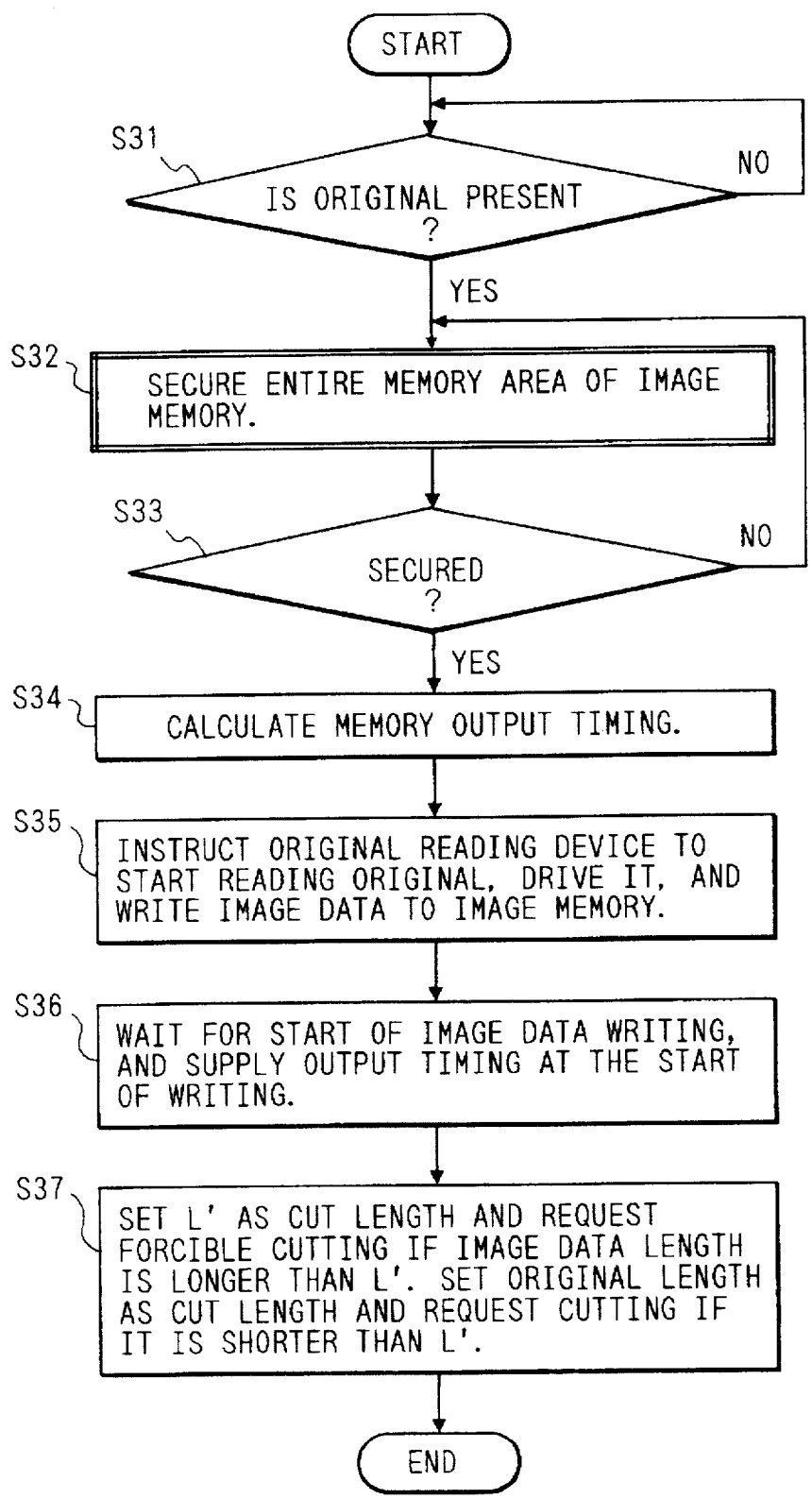

COPYING MACHINE WITH MEMORY OUTPUT START TIME CONTROL

BACKGROUND OF THE INVENTION

The present invention relates to a copying machine and, more particularly, to a copying machine capable of efficiently copying a large-size original.

General electronic copying machines which are presently in widespread use are each comprised of an original reading device for reading an image from an original and outputting image data thereof, an image memory for storing the image data, and an output device for transferring the image onto paper on the basis of the image data stored in the image memory. As shown in FIG. 16, in a conventional copying machine, after the reading of the original is completed, and image data corresponding to one original is stored in the image memory, output processing is started in which the image is transferred onto the copying paper and the copying paper with the image transferred onto it is discharged. On the other hand, in a case where a plurality of originals are copied continuously, since there is a limit to the amount of image data that can be stored in the image memory, the processing of a second original is started after completion of the reading of a first original and the transfer of the image onto the paper, as shown in FIG. 17.

As described above, in the conventional copying machine, the copying of the image on an original is not started until the reading of the original is completed and image data of one original is stored in the image memory. For this reason, the following problems have been encountered.

(1) In a case where the size of the original is large and the reading time becomes long, the time duration from the time a copying start is instructed until the paper after copying begins to be discharged, i.e., the first copy output time (FCOT), becomes long. Particularly in a machine type which is equipped with an output device capable of undergoing high-speed operation, even if the transfer of an image onto paper can be effected in a short time, the overall efficiency of the copying machine is restricted by the original-reading time of the original reading device, as described above.

(2) Since it is necessary to store all the image data of the original in the image memory so as to effect copying, it is impossible to copy an original having a large size which exceeds a maximum capacity of the image memory.

(3) In starting the reading of an original, the image memory must have available space sufficient to store the image data of the original. In addition, the image data which has been read from the original needs be stored in the image memory until the copying of that original is completed. However, in the above-described conventional copying machine, in a case where a plurality of originals having a large size equivalent to image data which can be maximally stored in the image memory are copied continuously, the time duration from the time the copying of each original is started until the image data used in the copying thereof is read from the image memory becomes long, so that copying intervals become long, thereby extremely deteriorating the productivity of copies.

SUMMARY OF THE INVENTION

The present invention has been devised in view of the above-described circumstances, and its object is to provide a copying machine capable of overcoming the above-described problems and effecting copying with high efficiency.

According to the invention, a copying machine comprises:

- an original reading device for reading an image on an original in response to a read command, to produce image data;
- an image memory for storing the image data;
- an output device, responsive to an output command, for performing an output process of transferring an image corresponding to the image data stored in said image memory onto a sheet in an output time that is shorter than a read time necessary for said original reading device to read the original of one page, and outputting an image-transferred sheet; and
- a control device for supplying the read command to said original reading device, and for supplying the output command to said output device so that the output process is started with a delay of a predetermined standby time from a time point when said original reading device starts reading the original, the standby time being set longer than a difference between the read time and the output time and shorter than the output time.

The standby time may be set at a time required for image data corresponding to a predetermined part of a storage capacity of said image memory to be written to said image memory, and the image data may be written to and read from a memory area of the image memory in a cyclic manner.

Further, a memory area of the image data may be freed for writing of new image data at a time point when the output process on the image data stored in the image memory is started.

BRIEF DESCRIPTION OF THE DRAWINGS

FIG. 3 is a diagram illustrating a configuration of an output device 3 in the embodiment;

FIG. 4 is a functional block diagram explaining the controlling function of a control section 4 in the embodiment;

FIG. 5 is a flowchart illustrating processing contents of a memory-output-timing calculating means in the embodiment;

FIG. 7 is an operation sequence diagram illustrating the operation of the embodiment;

FIG. 8 is a flowchart illustrating the operation in the case of fixed-size copying in the embodiment;

FIG. 12 is a flowchart illustrating the operation in the case of synchro-cut copying in the embodiment;

DESCRIPTION OF THE PREFERRED EMBODIMENTS

The present invention will be hereinafter described with reference to the accompanying drawings.

Figure 1:
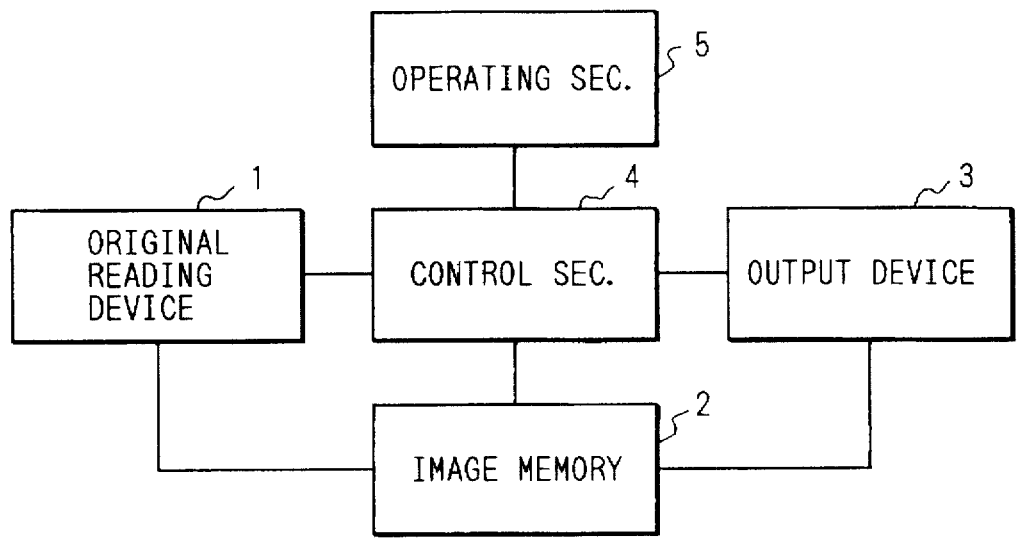
FIG. 1 is a block diagram illustrating a configuration of a copying machine in accordance with an embodiment of the present invention.

First, a description will be made of a configuration of a copying machine according to an embodiment of the invention with reference to FIG. 1, which is a block diagram illustrating a functional configuration of the copying machine. As shown in this drawing, the copying machine in accordance with this embodiment is comprised of an original reading device 1 for reading an original and outputting image data thereof, an image memory 2 for storing the image data, an output device 3 for transferring an image onto paper on the basis of the image data stored in the image memory 2 and for discharging the paper, a control section 4 for control the aforementioned various sections, and an operating section 5 for entering various commands into the control section 4 and for displaying information imparted from the control section 4.

Figure 2:
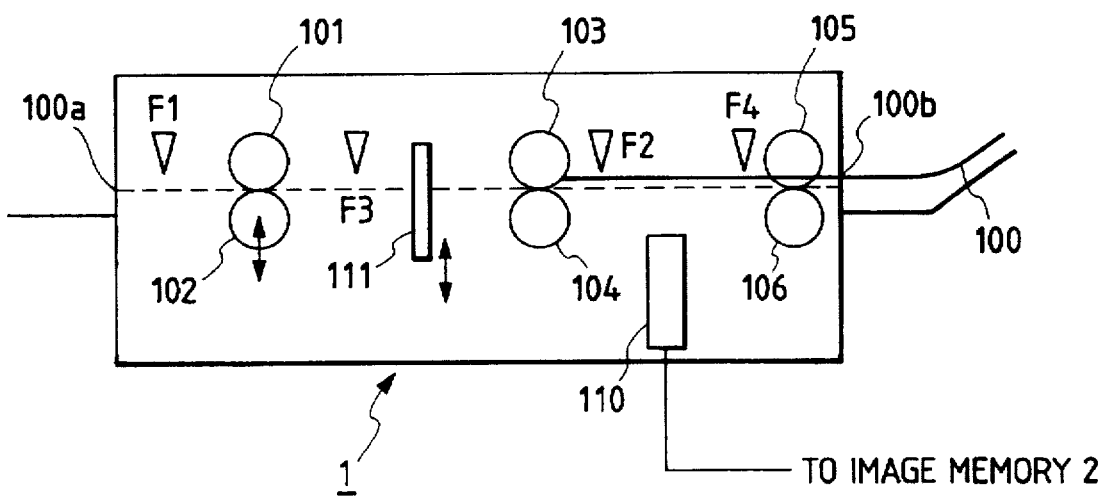
FIG. 2 is a diagram illustrating a configuration of an original reading device 1 in the embodiment.

The configuration of the original reading device 1 is shown in FIG. 2. Transport rollers 101 to 106 for transporting an original 100 along a predetermined transporting direction are provided in the original reading device 1. These transport rollers 101 to 106 constitute a total of three transporting means as the respective two rollers arranged vertically in FIG. 2 form pairs. The original 100 inserted through an original inserting port 100a is consecutively transported by the respective transporting means, first through the transport rollers 101 and 102 constituting a first transporting means, then through the transport rollers 103 and 104 constituting a second transporting means, and further through the transport rollers 105 and 106 constituting a third transporting means, and is discharged from an original discharging port 100b.

A read sensor 110 is disposed between the sections of the transport rollers 103 and 104 serving as the second transporting means and the transport rollers 105 and 106 serving as the third transporting means. This read sensor 110 is a one-dimensional sensor in which a multiplicity of light-detecting sensors are arrayed in a direction perpendicular to the transporting direction of the original 100, and the light reflected from the surface of the original 100 is detected by these light-detecting sensors. The respective output signals from the light-detecting sensors are consecutively scanned in a fixed period and are consecutively converted into digital signals, respectively, thereby generating image data of a straight-line portion opposing the light-detecting sensors in the overall image on the surface of the original 100. In addition, as the generation of the image data is repeated in conjunction with the transporting of the original 100, the image data representing the image on the surface of the original 100 is generated. The image data obtained by the read sensor 110 is written into the image memory 2.

Sensors F1 to F4 for detecting the passage of an end of the original 100 are disposed at strategic points midway in the transporting passage of the original 100. In addition, a gate 111 is provided between the transport rollers 101 and 102 serving as the first transporting means on the one hand, and the transport rollers 103 and 104 serving as the second transporting means on the other. This gate is opened only during the period when the operation of reading the original 100 by the read sensor 110 is carried out, so as to allow the original 100 to pass to the second transporting-means side.

The configuration of the output device is shown in FIG. 3. Reference numerals 301 and 302 denote paper trays, and 310 denotes a paper feed roller. In addition, numeral 311 denotes a cutter for cutting copying paper fed out from the roller 310. Which of sheets stored in the paper trays 301 and 302 and the copying paper wound around the paper feed roller 310 is to be used is selected on the basis of the operation by the user. The selected copying paper is sent to a transfer section 320 in response to an output command from the control section 4. A registration sensor 322 for detecting the arrival of the copying paper is disposed downstream of the transfer section 320. An exposing section 331 effects exposure processing with respect to the surface of a transfer drum 321 rotating at a fixed speed, on the basis of the image data supplied from the image memory 2, and forms a latent image corresponding to the image data. A developing section 332 imparts a toner to the surface of the transfer drum 321 where the latent image is thus formed, thereby forming a toner image corresponding to the image data on the surface of the transfer drum 321. The transfer section 320 causes the copying paper to be pressed against the surface of the transfer drum 321, and causes the toner image on the surface of the transfer drum 321 to be transferred onto the copying paper. The copying paper onto which the toner image is thus transferred undergoes fusing processing by a fusing section 340, and then passes through a paper discharging/transporting passage 350 and is discharged.

The control section 4 controls the various sections in the copying machine by executing a predetermined control program, and the contents of the control program can be expressed in blocks, as shown in FIG. 4. The details of control effected by the control section 4 can be described for each block as follows.

Copying-conditions Setting Means B1

Various copying conditions are set, including, for instance, the magnification, a distinction between fixed-size copying and synchro-cut copying, and the specification of paper, which are set by the operation of the operating section 5. The processing of settings necessary for effecting copying processing is carried out in accordance with the relevant conditions.

Memory-output-timing Calculating Means B2

Image data is read from the image memory 2, and a timing at which output processing for transferring an image corresponding to the image data onto the copying paper is started is calculated. Specifically, processing is performed as follows.

First, the original is read sequentially by the read sensor 110, starting with a leading end portion thereof, and is written consecutively into the image memory 2 as image data. Meanwhile, when copying is effected by using the image data thus obtained in the image memory 2, the image data in the image memory 2 is consecutively read, starting with a portion corresponding to a leading end of the original, and is used for copying. Here, to effect copying properly, it is not necessary to wait until the completion of the reading of the original, and it is possible to start the reading of the image data prior to the time of completion of reading. In order to finish the copying of a first sheet of copying paper as quickly as possible, the reading of the image data should be started as quickly as possible.

However, in order to effect copying properly, it is necessary to select a phase difference between image-data write processing and read processing such that the writing of the image data into the image memory 2 is completed before the reading of the image data on each portion of the original. In the case of this embodiment, since the speed of reading the image data is faster than the speed of writing the image data, if the processing of reading the image data is started too early, a situation occurs in which the reading of the entire image data stored in the image memory 2 is completed before the image data of one original is stored in the image memory 2, and copying is thereby interrupted.

Accordingly, in this embodiment, in order to maximally step up the timing of discharging the first sheet of copying paper within a range in which copying is effected properly, the processing of writing the image data and the processing of reading the image data are executed in parallel so that the timing at which the writing of the image data of one original into the image memory 2 is completed and the timing at which the reading of the total image data of one original from the image memory 2 is completed will coincide with each other. Namely, the following processing is carried out.

Figure 6:
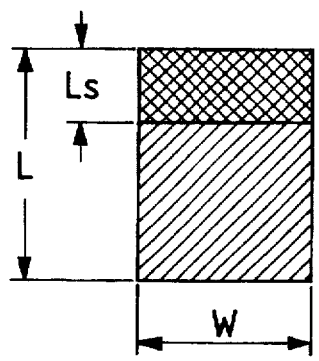
FIG. 6 is a diagram explaining a method of calculating the memory output timing in the embodiment.

FIG. 6 shows a one-original portion of image data stored in the image memory 2. In the drawing, W denotes a memory width, and represents the amount of a one-line portion of image data. L denotes the memory length, and represents the number of lines of the one-original portion of the total image data. Ls represents the number of lines of the image data to be stored in the image memory 2 prior to starting the reading of the image data. Here, the number of lines Ls is determined as follows.

First, if it is assumed that the speed of writing the image data is Si (lines/sec), and that the reading speed is So (lines/sec, the time required for writing the total image data of L lines into the image memory 2 becomes L/Si, and the time required for reading the same from the image memory 2 becomes L/So. Accordingly, If the reading of the image data is started after the lapse of the time (L/Si)−(L/So) after starting the writing of the image data, the timing of the completion of reading and the timing of the completion of writing coincide with each other. During the time this duration (L/Si)−(L/So) elapses, the image data is written at the writing speed Si. Accordingly, the aforementioned Ls can be determined by the following formula:

$$Ls=\{(L/Si)-(L/So)\}Si=n-\{(L\times Si)/So\} \quad (1)$$

In addition, the required time T for writing the image data corresponding to one line can be determined by the following formula:

$$T=Ls/Si \quad (2)$$

In addition, in cases where the magnification of copying is not 100%, processing is added in which the right-hand side of the above formula is multiplied by a coefficient corresponding to the magnification. That is, in this embodiment, the magnification is changed by changing the transporting speed of the original instead of changing the sampling period for obtaining the image data, so that the image data obtained from the original assumes an amount corresponding to the magnification. Hence, in cases where the magnification exceeds 100%, the aforementioned T needs to be made long correspondingly, and in cases where the magnification is less than 100%, T needs to be made short correspondingly.

In this embodiment, when copying is carried out, the calculation of Formulae (1) and (2) above is respectively executed, as the flow is shown in FIG. 5, and the standby time T from the time the writing of the image data is started until reading is started is calculated. Described above is the processing of calculation by the memory-output-timing calculating means B2.

Image Reading Means B3

The image reading means B3 performs a series of processing described below.

(1) The original 100 is inserted through the original inserting port 100a into the original reading device 1. In addition, the original 100 is moved by the transport rollers 191 to 106.

(2) The passage of the original 100 through the respective strategic points is detected by the sensors F1 to F4.

(3) The output from the read sensor 110 is sampled for each fixed sampling period to prepare image data, and this image data is written into the image memory 2.

Memory Management Means B4

This is a means for providing management concerning what image data is stored in which storage area in the image memory 2. In addition, a storage area for writing the image data which has been read by the read sensor 110 is secured by the memory management means B4.

Image Output Means B5

This image output means B5 reads the image data stored in the image memory 2, and causes the output means 3 to transfer an image corresponding to this image data onto the copying paper.

Next, a description will be made of the operation of the copying machine according to this embodiment.

Figure 9:
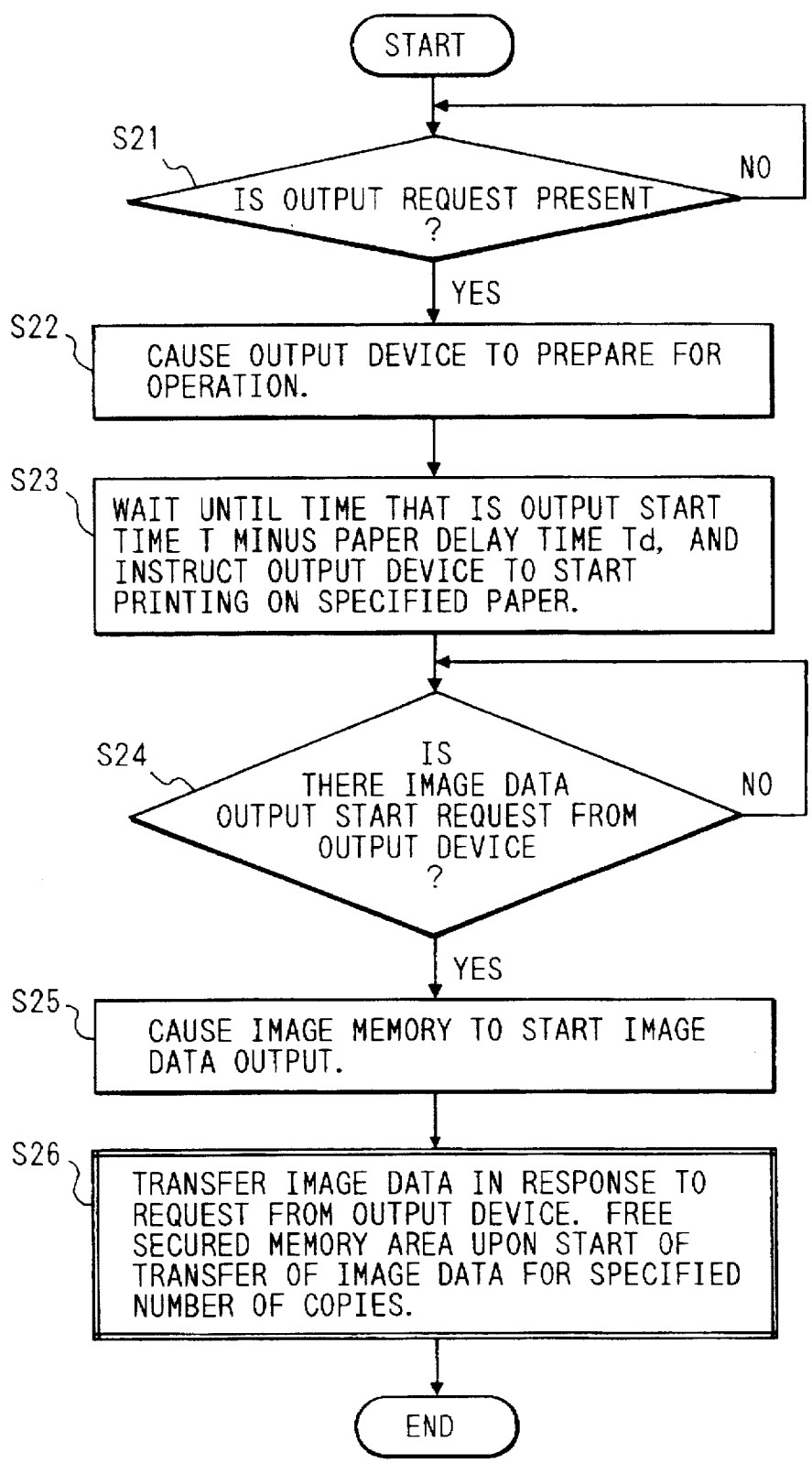
FIG. 9 is a flowchart illustrating the operation in the case of fixed-size copying in the embodiment.

FIG. 7 is a sequence diagram representing the operation of this copying machine, and illustrates the manner in which control information is transmitted and received between the respective sections within the copying machine with respect to the case of fixed-size copying and the case of synchro-cut copying, respectively. In addition, FIGS. 8 and 9 are flowcharts illustrating the operation in the case of fixed-size copying in the control section 4. Hereafter, referring to these drawings, a description will be given of the operation of this embodiment in the case of fixed-size copying.

Fixed-size Copying

After the setting of various copying conditions (magnification and the like) is designated by the operating section 5, the control section 4 starts processing beginning with the read routine whose flow is shown in FIG. 8. First, the operation proceeds to Step S11 to determine whether or not an original has been inserted through the original inserting port 100a, and if the original has not been inserted, the operation waits as it is. If the leading end of the original is detected by the sensor F1, the operation proceeds from Step S11 to Step S12. In Step S12, the width of the original is detected by the sensor F1, and a storage capacity necessary for storing the image data is calculated on the basis of the detected result. The way in which the storage capacity is calculated differs depending on fixed-size copying and synchro-cut copying, and in the case of fixed-size copying in which the original of a designated size is copied, the width of the original is multiplied by predetermined dimensions corresponding to the designated original size and a coefficient corresponding to the copying magnification, so as to determine a necessary storage capacity. In the usable storage are of the image memory 2, a storage area corresponding to the aforementioned storage capacity is secured as a storage area for storing the image data which is read from the original. Then, the operation proceeds to Step S13 to determine whether or not a necessary storage area has been secured in Step S12, and if it has not been secured, the operation returns to Step S12.

If it has been possible to secure the storage area for storing the image data of the original, the operation proceeds from Step S13 to Step S14 to effect the processing of calculating the memory output timing. That is, the calculation of Formulae (1) and (2) above is executed by effecting the processing by the aforementioned memory-output-timing calculating means B2 (FIG. 4), so as to obtain the standby time T from the timing of starting the writing of the image data until the timing of reading.

Then, the operation proceeds to Step S15 to transmit a command for starting the reading of the original to the original reading device 1. As a result, the scanning of the respective output signals from the light-detecting sensors constituting the read sensor 110 is started, and the image data obtained each time this scanning is repeated is consecutively written into the image memory 2.

Then, the operation proceeds to Step S16, and in this step the operation waits until the inputting of the image data into the image memory 2 is started, and the setting of the output timing of the image data (a request for output) is effected by the inputting of the initial image data. That is, the timing that is after, by the standby time T determined in Step S14, the time point when the initial image data is inputted, is set as an output start timing of the image data. This completes the read routine.

Meanwhile, the control section 4 executes an output routine whose flow is shown in FIG. 9, in parallel with the processing shown in FIG. 8.

If the setting of an output timing (a request for output) is carried out in Step S16 in FIG. 8, the result of determination as to whether or not a request for output has been made in Step S21 becomes "YES," and the operation proceeds from Step S21 to Step S22. Then, the operation proceeds to Step S22 in which preparations for operation of the output device 3 are made.

Then, the operation proceeds to Step S23 to determine a timing in which a paper delay time Tdi is subtracted from the output start timing set in Step S16 in the above-described original reading routine. After the operation waits until this timing, a printing start command is transmitted to the output device 3. Here, the paper delay time Tdi is the time required for the copying paper to reach the registration sensor 322 downstream of the transfer section 320 from the paper feeding section (the paper trays and the paper feed roller). This paper delay time Tdi assumes different values depending on which of the paper trays 301 and 302 and the paper feed roller 310 is being selected as the paper feeding section. In Step S23, however, a paper delay time Tdi which corresponds to the paper feeding section presently being selected is selected, and the timing at which the printing start command is outputted is calculated on the basis of the selected Tdi. Then, the operation proceeds to Step S24 to determine whether or not the output device 3 has made a request for starting the outputting of the image data.

As the printing start command is outputted in Step S22, the copying paper is supplied from the paper feeding section to the output device 3. When the copying paper reaches the position of the registration sensor 322, a request for starting the outputting of the image data is transmitted from the output device 3 to the control section 4. In a case where the request for an output start has already arrived at the time of the determination in the aforementioned Step S24, processing at the control section 4 proceeds to Step S25 to start the outputting of the image data from the image memory 2 by means of the image output means B5.

Then, the operation proceeds to Step S26 to output the image data under control by the image output means B5. That is, in the case where the number of copies to be made is plural, the request for an output start of the image data is transmitted from the output device 3 to the control section 4 each time the copying paper is fed. Consequently, after confirming the same, the control section 4 causes the image data to be outputted from the image memory 2. Then, at the point of time when the output processing of copying a final sheet among the designated number of sheets, the storage area in which the image data for copying has been stored up until then is freed for the storage of other image data. This completes the overall processing of fixed-size copying.

Figure 14:
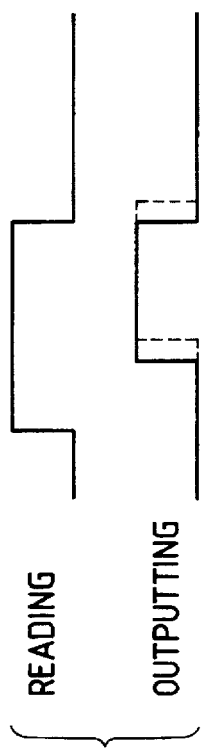
FIG. 14 is a timing chart illustrating the operation of the embodiment.
Figure 15:
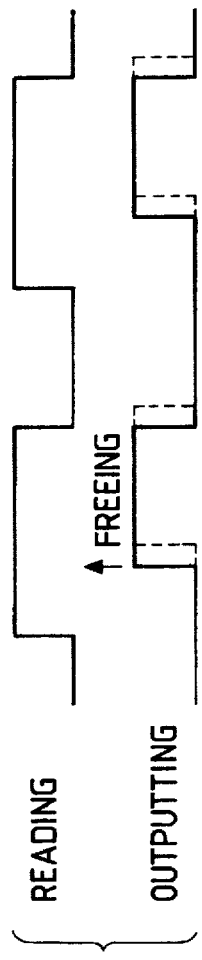
FIG. 15 is a timing chart illustrating the operation of the embodiment.
Figure 16:
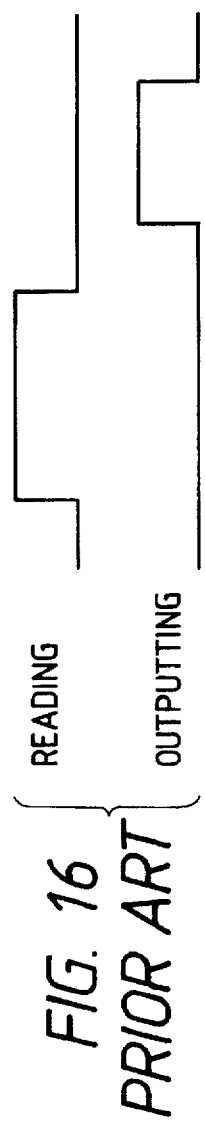
FIG. 16 is a timing chart illustrating the operation of a conventional copying machine.
Figure 17:
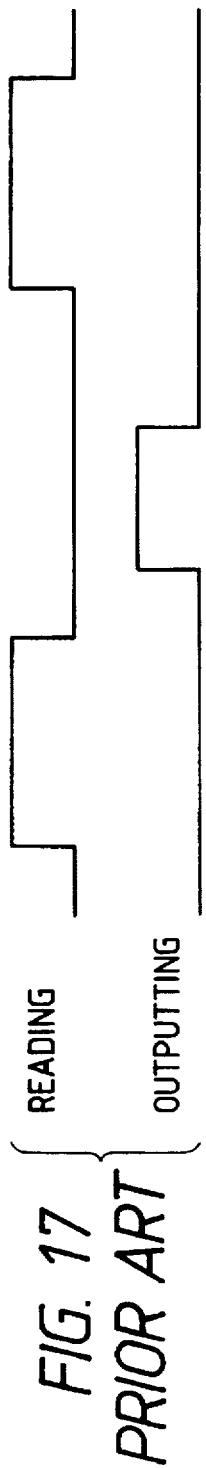
FIG. 17 is a timing chart illustrating the operation of the conventional copying machine.

FIGS. 14 and 15 show timing relationships between read processing of an original and output processing of a copy, which are performed by the above-described control. FIG. 14 shows a case where one original is copied, and FIG. 15 shows a case where a plurality of originals are copied continuously. As shown in these drawings, in the read processing and output processing of the original, start timings are controlled such that the respective end timings coincide with each other. Since output processing is started without waiting for the end of read processing in this way, the time duration from the time a copying start is instructed until a first copy is outputted can be made short.

In addition, in this embodiment, at a point of time when output processing concerning each original is started, as shown in FIG. 15, the storage area within the image memory 2 used for storing the image data of the original is freed for storing the image data of a new original. The reason for this is that if output processing is started, and the image data is read and used for copying, it is possible to write other image data into the storage area from which the image data has been read. Accordingly, it is possible to reduce the frequency with which the storage area within the image memory 2 is set in a state of shortage, thereby making it possible to efficiency perform the continuous copying of a plurality of originals.

Synchro-cut Copying

In synchro-cut copying in which copying paper is cut to the length of the original to effect copying, there are cases where a very long original is copied, and a large amount of image data is outputted from the original reading device 1. Therefore, in order to make it possible to withstand such use, it is necessary to devise the manner of input/output processing with respect to the image memory 2 to enable the writing and reading of a large amount of image data.

Figure 10:
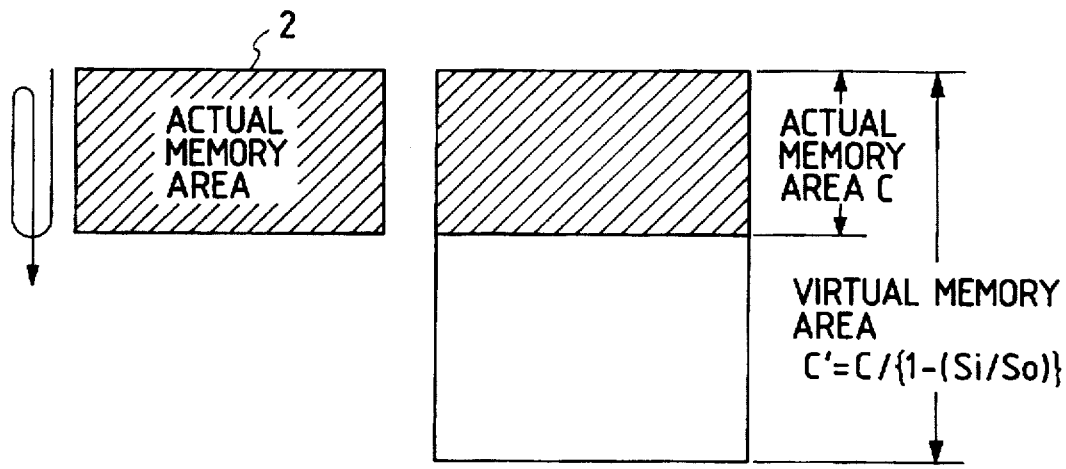
FIG. 10 explains a mode of controlling the input to and output from an image memory 2 in the case of synchro-cut copying in the embodiment.

In cases where synchro-cut copying is performed in this embodiment, the writing of image data into the image memory 2 is effected in a cyclic manner, as shown in FIG. 10, such that the image data is written into the image memory 2 while the write address is being consecutively advanced starting at a 0th address, and when the write address has reached a final address of the image memory, the address returns again to the 0th address. Meanwhile, the reading of the image data is effected in a cyclic manner as in the case of writing, but at a point of time when the writing of the image data corresponding to the entire storage capacity of the image memory 2, the read processing of the image data is started in such a manner as to follow the write processing. If such input/output control of image data is carried out, if it is assumed that the total storage capacity provided in the image memory 2 is C, that the speed of writing the image data is Si (lines/sec), and that the reading speed is So (lines/sec), it is possible to use the image memory 2 as virtual memory having a storage capacity $C'=C/\{1-(Si/So)\}$.

Figure 11:
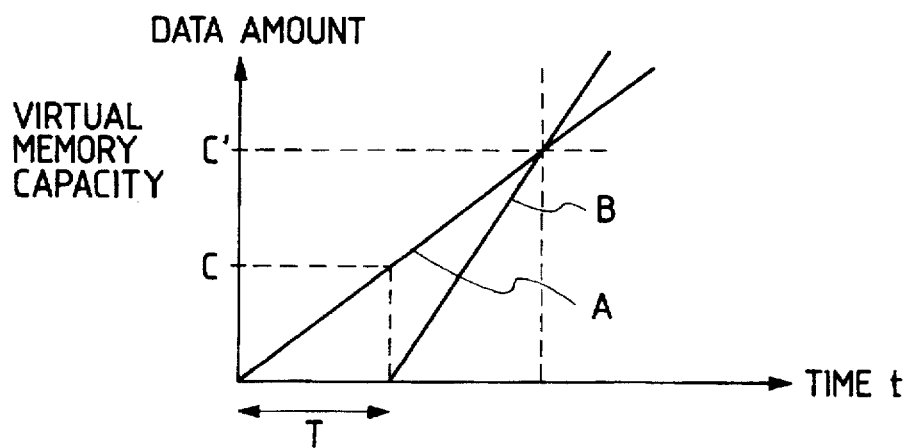
FIG. 11 explains a mode of controlling the input to and output from the image memory 2 in the case of synchro-cut copying in the embodiment.

FIG. 11 shows this basic principle in the form of a graph, in which abscissa represents the elapsed time t, while the ordinate represents the amount of image data inputted and outputted with respect to the image memory 2. In addition, the straight line A shows a change over time of the integrated amount of the image data written into the image memory 2, and rises upward with an inclination Si with the lapse of time. Here, the ordinate value of the straight line A at time t=T corresponds to the overall storage capacity C of the image memory 2. In addition, the straight line B which begins to rise upward by lagging behind the straight line A by the time T shows the integrated amount of the image data which is read from the image memory 2, and rises with an inclination So with the lapse of time. The point of intersection between the straight lines A and B means that the read processing of the image data outpaces the write processing at that point, and that it becomes impossible to continue the reading and writing of the image data. The ordinate value of the point of intersection between the straight lines A and B corresponds to the storage capacity C' of the virtual memory.

Referring now to the flowcharts shown in FIGS. 12 and 13, a description will be given of the operation in the case of synchro-cut copying. In a state in which the designation of synchro-cut copying is given, the control section 4 first executes a read routine whose flow is shown in FIG. 12. Each processing in Steps S31 to S36 of this read routine corresponds to each processing in Steps S11 to S16 of the original reading routine shown in FIG. 8 referred to above, and as for the contents of processing as well, most portions are common. Accordingly, a description will be given of only those portions whose processing contents differ from those of the routine referred to above.

First, in the case of fixed-size copying, although in Step S12 (FIG. 8) a storage area having a capacity corresponding to the designation of the size of the original was secured, in Step S32 of this routine the entire storage area within the image memory 2 is secured. The reason for this is that, in synchro-cut copying, there are many cases where large-size originals are handled, and it is necessary to store a large amount of image data in the image memory 2.

In addition, in the processing of calculating the memory output timing in Step S34, the output start timing of the image data is set on the basis of the time T shown in FIG. 11, i.e., the time required for writing the image data corresponding to the total storage capacity of the image memory 2.

Then, in this routine, after Step S36, the operation further proceeds to Step S37 to effect processing for generating a cut request. Namely, the control section 4 detects the length of the original by the sensor F1 in the original reading device 1, multiplies the detected length of the original by the magnification of copying, and sets the result as the cut length of the copying paper. Further, in cases where the cut length exceeds a predetermined allowable length L', L' is set as the cut length.

Figure 13:
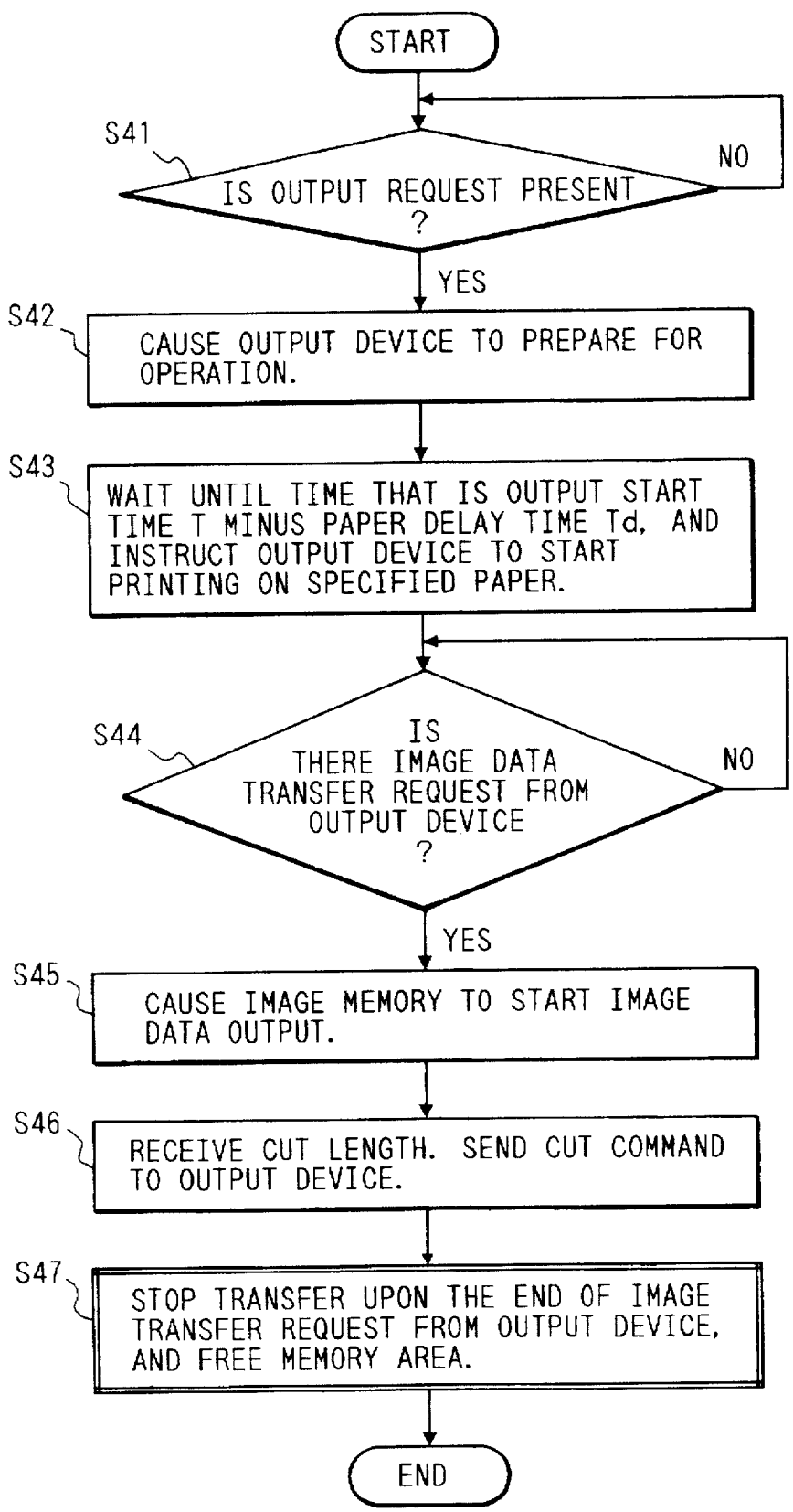
FIG. 13 is a flowchart illustrating the operation in the case of synchro-cut copying in the embodiment.

This completes the original reading routine, the control section 4 executes an output routine whose flow is shown in FIG. 13. Each processing in Steps S41 to S45 of this output routine corresponds to each processing in Steps S21 to S25 of the output routine shown in FIG. 9 referred to above, and the contents of processing are also the same. Accordingly, a description will be given of only Steps S46 and S47 which effect processing not provided in the routine referred to above.

First, in Step S46, the cut length which was set in the aforementioned Step S37 is read, and is transmitted to the output device 3. As a result, during the period until the copying paper of the received cut length is sent to the output device 3, the output device 3 requests the transfer of the image data to the control section 4, and effects the transfer of an image in accordance with the image data transmitted thereto in response to that request. Then, the output device 3 cuts the copying paper by the cutter 311 at the point of time the copying paper of the cut length is sent thereto from the paper feed roller 310, and stops the image-data transfer request with respect to the control section 4.

Meanwhile, after transmitting the cut length in Step S46, the control section 4 proceeds to processing in Step S47. In this Step S47, the control section 4 causes the image data to be transferred from the image memory 2 to the output device 4 only during the period when the image-data transfer request is present, and the control section 4 causes the transfer of the image data to be stopped as the transfer request is stopped, thereby freeing the image memory 2. This completes synchro-cut copying.

The present invention is not restricted to the foregoing embodiment, and the following modifications are possible.

(1) As for the read processing of an original and the output processing of a copy, end timings need not necessarily be made to coincide with each other, and a desired effect can be obtained by providing an arrangement such that read processing ends a short time before output processing ends, as indicated by the broken lines in FIGS. 14 and 15. In short, it is possible to step up the start timing of output processing to the extent that output processing does not outpace read processing, and the present invention steps up the copy output time by making use of this basic principle.

(2) Although, in the above-described embodiment, the time required until the image data corresponding to the total storage capacity of the image memory 2 is written is set as the standby time T at the time of synchro-cut copying, the time required until the image data corresponding to a predetermined capacity of not more than the total storage capacity may be set as the standby time T.

As described above, since output processing is started before the reading of an original is completed, there is an advantage that a first copy is discharged in a short time after a copying start command is given.

Since the image data exceeding the total storage capacity of the image memory can be stored in the image memory by cyclically using each storage area within the image memory, there is an advantage that it is possible to copy an original having a large size equivalent to the aforementioned total storage capacity.

Further, the storage area for storing the image data is freed for writing of new image data at a point of time when the output processing is started with respect to the image data in the image memory. Since a storage area necessary for storing the image data can be obtained at an early time point, there is an advantage that it is possible to efficiently execute continuous copying of a plurality of originals.

What is claimed is:

1. A copying machine comprising:

an original reading device for reading an image on an original in response to a read command, to produce image data;

an image memory for storing the image data;

an output device, responsive to an output command, for performing an output process of transferring an image corresponding to the image data stored in said image memory onto a sheet in an output time that is shorter than a read time necessary for said original reading device to read the original of one page, and outputting an image-transferred sheet; and a control device for supplying the read command to said original reading device, and for supplying the output command to said output device so that the output process is started with a delay of a predetermined standby time from a time point when said original reading device starts reading the original, the standby time being set longer than a difference between the read time and the output time and shorter than the output time.

2. The copying machine according to claim 1, wherein the standby time is set at a time required for image data corresponding to a predetermined part of a storage capacity of said image memory to be written to said image memory, and the image data is written to and read from a memory area of the image memory in a cyclic manner.

3. The copying machine according to claim 1 or 2, wherein a memory area of the image data is freed for writing of new image data at a time point when the output process on the image data stored in the image memory is started.

* * * * *